United States Patent [19]
Takeshita et al.

[11] 4,077,673
[45] Mar. 7, 1978

[54] FLUID PRESSURE CONTROLLING DEVICE

[75] Inventors: Hiroshi Takeshita, Chiryu; Hiroyuki Kondo, Toyota, both of Japan

[73] Assignee: Aisin Seiki Kabushiki Kaisha, Japan

[21] Appl. No.: 703,190

[22] Filed: Jul. 7, 1976

[30] Foreign Application Priority Data
Jul. 10, 1975   Japan .................................. 50-85008

[51] Int. Cl.² .............................................. B60T 8/26
[52] U.S. Cl. .................................. 303/24 F; 303/6 C
[58] Field of Search ................. 303/24 A, 24 C, 24 F, 303/6 C; 137/38

[56] References Cited
U.S. PATENT DOCUMENTS
3,252,740  5/1966  Stelzer ........................... 303/24 F X
3,476,443  11/1969  Bratten et al. ..................... 303/24 C Primary Examiner—George E. A. Halvosa
Attorney, Agent, or Firm—Oblon, Fisher, Spivak, McClelland & Maier

[57] ABSTRACT

A fluid pressure controlling device for use in a vehicle brake system includes a deceleration responsive valve member which closes to interrupt fluid communication between a fluid pressure source and a brake cylinder when the fluid pressure generated in the fluid pressure source reaches a first predetermined value. A valve opening member is provided for opening the valve member when the fluid pressure reaches a second predetermined value.

3 Claims, 3 Drawing Figures

FLUID PRESSURE CONTROLLING DEVICE

BACKGROUND OF THE INVENTION

1. Field of the Invention

This invention relates generally to a fluid pressure controlling device to be inserted in the fluid brake system of a vehicle having front and rear wheels.

2. Description of the Prior Art

In such fluid vehicle braking systems, if the driver actuates the brake pedal for applying a braking fluid pressure equally to all the vehicle wheels, the rear wheels are more likely to be subjected to locking, thereby giving rise to dangerous skidding.

The use of a so-called G-valve assembly in such braking systems for avoiding such dangerous skidding is well known. In these assemblies, a ball valve member rolls up an inclined ramp upon deceleration of the vehicle and seats on a valve seat when a predetermined deceleration is reached, whereby the rear brake wheel cylinders are isolated from the common master cylinder. It is also well known that when the vehicle load is large, the predetermined deceleration point is reached at greater fluid pressure of the master cylinder than when the vehicle load is small. However, with a G-valve assembly installed, even if further increased fluid pressure is applied after the valve closes, when the vehicle load is large, the increased fluid pressure is not supplied to the rear brake wheel cylinders, since, as already indicated, they are then isolated from the common master cylinder. Therefore, the fluid pressure applied to the rear wheel cylinder is under the ideal pressure level. The lack of such increased fluid pressure being applied to the rear wheel cylinders, however, puts too much brake load on the front wheel cylinders, i.e., it results in the lack of sufficient and proper braking force for the vehicle.

In addition, it is also well known that a so-called load sensing valve assembly, or a device combining the aforementioned G-valve assembly and a proportioning valve assembly, can be inserted into the braking system for obviating these drawbacks of the G-valve assembly. However, these load sensing valve assemblies have been too complicated in structure and too expensive to manufacture.

SUMMARY OF THE INVENTION

Accordingly, it is an object of this invention to provide an improved fluid pressure controlling device which obviates the drawbacks of the conventional G-valve assemblies and load sensing valve assemblies.

The foregoing and other objects are attained according to at least one aspect of the present invention through the provision of an improved fluid pressure controlling device which includes a housing defining a valve chamber communicating with a stepped diameter bore, also in the housing, a deceleration responsive ball valve and a valve seat disposed in the valve chamber, a stepped diameter piston movably disposed in the housing bore with one end thereof being subject to fluid pressure from an external pressure source, such as the master cylinder, through an inlet in the housing, and the other end of the piston being engageable with the ball valve through the valve seat to unseat the ball valve when a predetermined pressure is applied to the one end of the piston, a spring device for urging the piston in a direction to keep the other end thereof from engaging the ball valve and unseating it, and another inlet into the valve chamber communicating it with the same source of fluid pressure, and an outlet communicating the valve chamber with the rear wheel brake cylinders when the ball valve is not seated and preventing such communication when the ball valve is seated.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein.

DETAILED DESCRIPTION OF A PREFERRED EMBODIMENT

Figure 1:
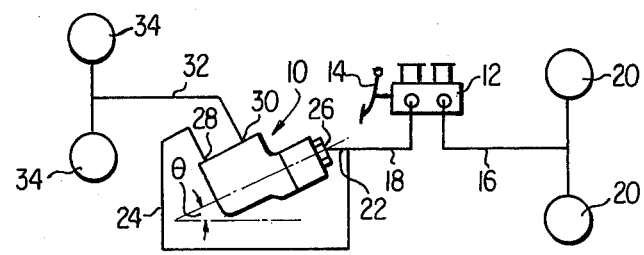
FIG. 1 is a schematic view showing a typical hydraulic braking system to which a fluid pressure controlling device according to the present invention is applied.

Referring now to FIG. 1, a fluid pressure controlling device 10 according to the present invention is employed in a usual brake system of a four-wheel vehicle. The brake system includes a hydraulic master cylinder 12 which is actuated by a foot pedal 14. Front and rear braking fluid lines 16 and 18, respectively, lead from the master cylinder 12, the front braking fluid line 16 being connected to a pair of front wheel cylinders 20, and the rear braking fluid line 18 being divided into two fluid lines 22 and 24, which are respectively connected to the fluid pressure controlling device 10 through two inlet ports 26 and 28 formed therein. The fluid pressure controlling device 10 has an outlet port 30 leading to a fluid line 32 which is connected to a pair of rear wheel cylinders 34. According to the braking system thus constructed, when the foot pedal 14 is depressed, fluid pressure is supplied from the master cylinder 12 directly to the front wheel cylinders 20 through the fluid line 16 and also to the fluid pressure controlling device 10 through the lines 18, 22 and 24. The controlling device 10 delivers from its outlet port 30 to the rear wheel cylinders 34 through the line 32 a fluid pressure which is modulated or unmodulated, as the case may be, during the braking operation.

Figure 2:
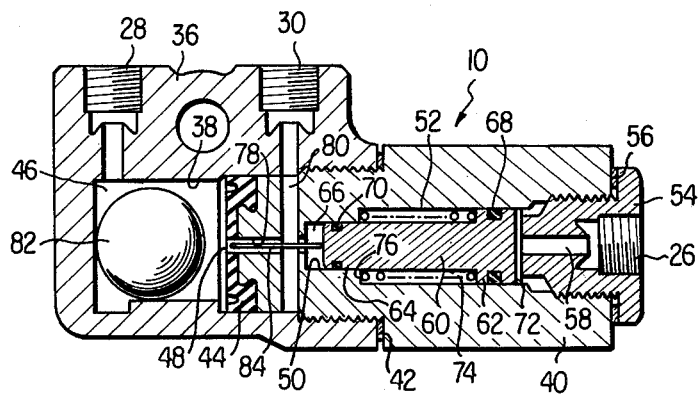
FIG. 2 is a longitudinal sectional view of a preferred form of the fluid pressure controlling device according to the present invention.

A detailed description of the construction of the fluid pressure controlling device 10 of this invention, in a preferred form, as illustrated in FIG. 2, now follows. Here, it can be seen that the fluid pressure controlling device 10 includes a housing 36 having a bore 38 formed therein from the right end thereof, as viewed in this figure, with the inlet and outlet ports, 28 and 30, respectively, being laterally formed therein to connect with the bore 38. The opening of the bore 38 is closed by a cylinder 40 which is threadedly secured to the housing 36. Suitable packing means 42 is employed to insure a seal between the housing 36 and the cylinder 40. A valve seat member 44 is secured to the left end surface, as viewed here, of the cylinder to define an inertia chamber 46 within the bore 38 adjacent the blind end thereof. The valve seat member 44 has a central valve opening 48. The cylinder 40 has a stepped bore formed therein, being comprised generally of a small diameter bore 50 and a large diameter bore 52. The bore, and more specifically, the right end portion of the large diameter bore 52, as viewed herein, is closed by a plug 54 which is threadedly secured thereinto, and suitable packing means 56 is employed to insure a seal between the plug 54 and the cylinder 40. The inlet port 26 is formed in the plug 54, being connected to the large diameter bore 52 by an axially extending passageway 58.

A stepped diameter piston 60 is reciprocably received in the stepped diameter bore. A large diameter piston section 62 thereof slidably fits within the large diameter bore 52, and a small diameter piston section 64 thereof extends leftward therefrom, as viewed in FIG. 2, with the left end portion of the small diameter piston section slidably fitting within the small diameter bore 50, where it cooperates therewith to define an outlet pressure chamber 66 at the rear or blind end of the bore. The large diameter piston section 62 and the end portion of the small diameter piston section 64 respectively have O-rings 68 and 70 recessed in the peripheries thereof which sealingly contact the walls of the respective bore portions in which they are slidably fitted to prevent the passage of fluid thereby. The right end surface of the piston 60 and the left end surface of the plug 54 define an inlet pressure chamber 72 within the large diameter bore 52, so that the piston end surface is subjected to fluid pressure supplied from the master cylinder 12 to the pressure chamber 72. The left radially extending end surface of the large diameter piston section 62 acts as a seat for a spring 74, the other end of which engages the bore shoulder 76 between the stepped bores 50 and 52, so that the spring 74 thus urges the piston 60 to the right, as viewed in the drawing. An axially extending central passage 78 is provided in the cylinder 40 in the end thereof disposed in the housing 36, extending completely therethrough to the bore thereof to provide fluid communication between the outlet pressure chamber 66 and the inertia chamber 46 through the valve opening 48 of the valve seat member 44. This passageway 78 is connected in full fluid communication with the outlet port 30 formed in housing 36 by a passage 80 radially formed in the cylinder 40.

A valve element 82, in the form of a ball which is somewhat smaller in diameter than the length of the inertia chamber 46, is positioned within the inertia chamber 46 and rests on the bottom, or rear end, thereof. In the normal operating position of the vehicle in which the fluid pressure controlling device 10 is installed, the right end of the device 10, as shown in FIG. 1, would be disposed in the forward direction of vehicle movement and would be tilted upwardly at an angle $\theta$ from a horizontal plane. In such condition, the ball valve 82 will remain in the rest position, shown in FIG. 2, by virtue of its own weight, to be in sufficient spaced relation to the valve seat member 44 to permit free fluid communication between the chamber 46 and the passage 78.

The ball valve member 82 rolls up on the bottom of the inertia chamber 46 and seats on the valve opening 48 of the valve seat member 44 to cut off the fluid communication between the inertia chamber 46 and the passageway 78 whenever a predetermined level of vehicle deceleration occurs.

The left end of the piston 10 has a small diameter pin 84 extending axially therefrom into the passageway 78 with sufficient radial clearance to permit full fluid communication between the inertia chamber 46 and the outlet port 30. The end of the piston pin 84 projects out of the valve opening 48 into the inertia chamber 46 when the left end surface of the piston 60 contacts the left end wall of the small diameter bore section 50, as happens upon leftward movement of the piston 60, as will be described hereinafter.

The operation of the fluid pressure controlling device 10, thus constructed and arranged, will now be described with concurrent reference being made to FIGS. 1–3 of the drawings.

Figure 3:
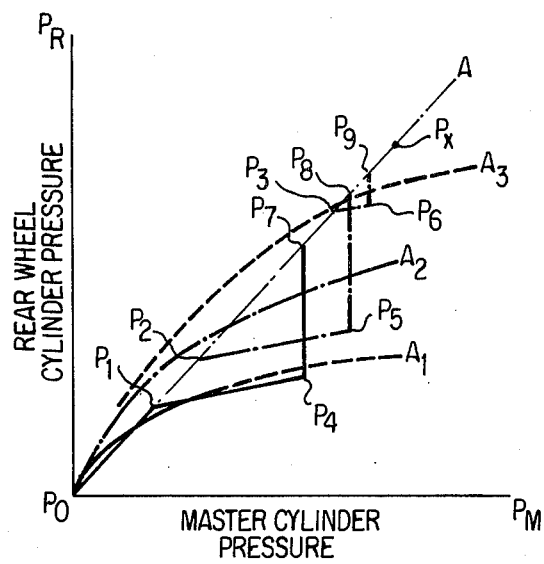
FIG. 3 is a graph showing the relation between the pressures in the master cylinder and the rear wheel cylinder.

FIG. 3 shows the relationship between the master cylinder pressure $Pm$, which is equal to the front wheel cylinder pressure, and the rear wheel cylinder pressure $Pr$. A straight line A in FIG. 3 represents the characteristic of the fluid pressure when the fluid pressure generated in the master cylinder 12 is directly delivered to the rear wheel cylinders 34. Curves $A_1$, $A_2$ and $A_3$ represent ideal relationships between the front and rear wheel cylinder pressures. The ideal curve varies from $A_1$ to $A_2$, and further to $A_3$, as the vehicle load $l$ increases from $l1$ to $l2$, and then to $l3$, wherein $l1$ shows the vehicle load $l$ is empty.

Now, if a moderate brake application is made, so that the vehicle deceleration is kept below a predetermined value, all of the parts will remain in the positions shown in FIG. 2. That is to say, the ball valve 82 will not close the valve opening 48 and the piston 60 remains in its rightward position under the urging of the spring 74.

Therefore, the fluid pressure generated in the master cylinder 12 is directed to the rear wheel cylinders 34 through the fluid lines 18 and 24, inlet port 28, inertia chamber 46, valve opening 48, passages 78 and 80, outlet 30 and the fluid line 32, and is also directed to the inlet port 26 through the fluid lines 18 and 22.

Of course, the fluid pressure generated in the master cylinder 12 is directly directed to the front wheel cylinders 20 through the fluid line 16. Accordingly, the rate of the fluid pressure to be applied to the front and rear wheel cylinders 20 and 34 will be the same. The characteristic line of the fluid pressure under this condition will be represented on the straight line A in FIG. 3.

If a relatively heavier brake application is made, such that the vehicle deceleration reaches the predetermined value, the weight of the vehicle is transferred forwardly, whereby the vall valve 82 rolls upward on the slanted bottom of the inertia chamber 46 and seats on the valve opening 48, thus cutting off the fluid communication between the inlet port 28 and the outlet port 30. Consequently, the rear wheel cylinders 34 are isolated from the master cylinder 12.

The value of the master cylinder pressure $Pm$, when the vehicle deceleration reaches the predetermined value, rises as the vehicle load increases, as for example, the value rises from $P_1$ to $P_2$ and further to $P_3$ as the vehicle load $l$ increases from $l1$ to $l2$ and then to $l3$ in FIG. 3. Therefore, the characteristic lines of the fluid pressure will be inflected at the points $P_1$, $P_2$ and $P_3$, respectively, according to the condition of the vehicle load $l$.

If further braking operation is continued after the ball valve 82 seats on the valve opening 48 to interrupt the fluid communication between the master cylinder 12 and the rear wheel cylinders 34, the value of the master cylinder pressure $Pm$ increases further and the fluid pressure generated in the master cylinder 12 is continuously delivered to the inlet ports 26 and 28 of the device 10. Therefore, the fluid pressure led into the chamber 72 acts on an effective area of the large diameter piston section 62 exposed to the chamber 72. When the fluid pressure acting on the effective area of the large diameter piston section 62 overcomes the total forces applied oppositely, which are made up of the force of the fluid pressure acting on an effective area of the small diameter piston pin 84, the force of the fluid pressure acting on an effective area of the small diameter piston section 64 and the biasing force of the spring 74, the piston 60 is urged to the left, whereby the volume of the chamber 66 decreases, depending upon the leftward movement of the piston, to thereby increase the rear wheel cylinder pressure.

When the master cylinder pressure $Pm$ reaches a certain value, the end of the small diameter piston pin 84 moves the ball valve 82 away from the valve opening 48 to re-establish fluid communication between the master cylinder 12 and the rear wheel cylinders 34. Accordingly, the value of the rear wheel cylinder pressure $Pr$ rises to the value which is equal to the value of the master cylinder pressure $Pm$ quickly.

The value of the master cylinder pressure $Pm$ at which the end of the piston pin 84 moves the ball valve 82 away from the valve opening 48 rises as the vehicle load $l$ increases, as for example, the value varies from $P_4$ to $P_5$ and further to $P_6$ as the vehicle load $l$ increases from $l1$ to $l2$ and $l3$ in FIG. 3 that is to say, the value of the master cylinder pressure $Pm$ at which the ball valve 82 is moved away from the valve opening 48 by the end of the small diameter piston pin 84 is set by three factors, one of which is fluid pressure difference between the pressure which acts on the effective area of the large diameter piston section 62 and the pressure in the passage 80 after the ball valve 82 seats on the valve opening 48, another of which is the distance between the position of the end of the piston pin 84 when the ball valve 82 seats on the valve opening 48 and the position of the same when the end of the piston pin 84 moves the ball valve 82 away from the valve opening 48, and the other being the biasing force of the spring 74.

Therefore, the fluid pressure difference between the master cylinder pressure $Pm$ when the ball valve 82 seats on the valve opening 48 and the same when the end of the piston pin 84 moves the ball valve 82 away from the valve opening 48 decreases as the vehicle load $l$ increases. Finally, the fluid pressure difference therebetween becomes zero. Assuming that the vehicle load $l$ increases and increases, and finally increases to $lx$, the vehicle deceleration reaches a point $Px$ of the master cylinder pressure $Pm$, and the ball valve 82 tries to seat on the valve opening 48 while the end of the piston pin 84 is already in the position where the same moves the ball valve 82 away from the valve opening 48. In this condition, the fluid pressure difference between the master cylinder pressure $Pm$ when the ball valve 82 seats on the valve opening 48 and the same when the ball valve 82 is moved away from the valve opening 48 by the piston 60 is zero.

Accordingly, the characteristic line of the fluid pressure in use of the device 10 of the present invention varies from $Po$, $P_1$, $P_4$, $P_7$ to $P_o$, $P_2$, $P_5$, $P_8$ and to $Po$, $P_3$, $P_6$, $P_9$ and finally to $Po$, $Px$ as the vehicle load $l$ increases from $l1$ to $l2$, then to $l3$ and finally to $lx$, as is shown in FIG. 3.

In the operation explained hereinbefore, assuming that the vehicle load $l$ and the effective areas of the large diameter piston section, the small diameter piston section and the piston pin are settled, the fluid pressure difference between the value of the master cylinder pressure $Pm$ when the ball valve 82 seats on the valve opening 48 and the value of the same when the ball valve 82 is moved away from the valve opening 48 by the piston 60 varies depending upon the intensity of the spring 74. That is to say, the time when the ball valve 82 seats on the valve opening 48 increases and the point $Px$ goes away to the right in FIG. 3 as the intensity of the spring 74 increases.

Obviously, many modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A fluid pressure control device for use in a vehicle fluid brake system comprising:

a housing having a first bore including a valve chamber and a stepped bore including a small diameter portion and a large diameter portion;

a stepped piston having a small diameter portion sealingly slidable in said small diameter bore portion and a large diameter portion sealingly slidable in said large diameter bore portion;

an outlet pressure chamber defined by one end of said stepped piston within said small diameter bore portion;

an inlet pressure chamber defined by the other end of said piston within said large diameter bore portion;

a passage connecting said first bore with said outlet pressure chamber;

a valve seat member in said first bore and separating said valve chamber and said passage;

a deceleration responsive valve member in said valve chamber and moving toward said valve seat to interrupt a fluid communication between said valve chamber and said passage when the vehicle deceleration reaches a predetermined value;

a first inlet connecting a source of fluid pressure with said valve chamber;

a second inlet connecting said source of fluid pressure with said inlet pressure chamber;

an outlet connecting said passage with a brake cylinder;

spring means urging said piston in a direction enlarging the volume of of said outlet pressure chamber; and pin means extending from said one end of said piston into said passage, the end of said pin means passing through said passage and said valve seat to move said valve member away from said valve seat to permit said fluid communication between said valve chamber and said passage when fluid pressure in said source of fluid pressure reaches a predetermined value.

2. A fluid pressure controlling device as set forth in claim 1, wherein said spring means is disposed within an atmospheric chamber defined by said piston within said large diameter bore portion.

3. A fluid pressure controlling device as set forth in claim 2, wherein said valve member is a ball.

* * * * *